(12) United States Patent
Acreman et al.

(10) Patent No.: US 11,416,640 B2
(45) Date of Patent: Aug. 16, 2022

(54) SOFTWARE PRIVACY FOR QLED DISPLAY

(71) Applicant: Sharp Kabushiki Kaisha, Osaka (JP)

(72) Inventors: Andrew Acreman, Oxford (GB); Nathan James Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 192 days.

(21) Appl. No.: 16/988,789

(22) Filed: Aug. 10, 2020

(65) Prior Publication Data
US 2022/0043939 A1    Feb. 10, 2022

(51) Int. Cl.
| | |
|---|---|
| G06F 21/84 | (2013.01) |
| G06F 21/62 | (2013.01) |
| G09G 3/3233 | (2016.01) |
| H01L 51/50 | (2006.01) |
| G09G 3/18 | (2006.01) |

(52) U.S. Cl.
CPC .......... *G06F 21/84* (2013.01); *G06F 21/6245* (2013.01); *G09G 3/18* (2013.01); *G09G 3/3233* (2013.01); *H01L 51/502* (2013.01); *G06F 2221/032* (2013.01)

(58) Field of Classification Search
CPC .......... G06F 21/84; G06F 21/6245; G06F 2221/032; G09G 3/18; G09G 3/3233; G09G 2300/0443; G09G 3/36; G09G 5/10; G09G 2300/023; G09G 2320/028; G09G 2320/068; G09G 2358/00; H01L 51/502
See application file for complete search history.

(56) References Cited

U.S. PATENT DOCUMENTS

| | | | |
|---|---|---|---|
| 8,894,243 B2 | 11/2014 | Cho et al. | |
| 9,583,727 B2 | 2/2017 | Cho et al. | |
| 2006/0158098 A1 | 7/2006 | Raychaudhuri et al. | |
| 2010/0238352 A1* | 9/2010 | Dunn ............... | H04N 21/41415 348/E9.057 |
| 2011/0175936 A1 | 7/2011 | Smith et al. | |
| 2017/0003548 A1* | 1/2017 | Mizunuma ........ | G02F 1/133526 |
| 2019/0280232 A1 | 9/2019 | Chang et al. | |

FOREIGN PATENT DOCUMENTS

WO    WO 2017205174    11/2017

* cited by examiner

*Primary Examiner* — Mark W Regn
(74) *Attorney, Agent, or Firm* — Renner, Otto, Boisselle & Sklar, LLP

(57) ABSTRACT

A display device employs a patterned quantum rod layer having pixel elements driven by pixel splitting to generate a privacy viewing mode. The display device includes a patterned quantum rod layer having first pixel elements including first quantum rods wherein the first quantum rods are aligned in a first alignment direction, and second pixel elements including second quantum rods wherein the second quantum rods are aligned in a second alignment direction different from the first alignment direction. An electronic controller is configured to perform pixel splitting whereby the electronic controller drives the first pixel elements and the second pixel elements such that the patterned quantum rod layer has an off-axis luminance different from an on-axis luminance to generate a privacy viewing mode. The first alignment direction may be oriented 90° relative to the second alignment direction.

20 Claims, 18 Drawing Sheets

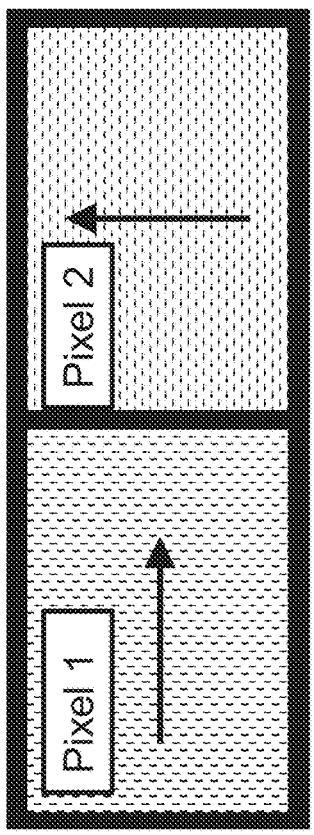
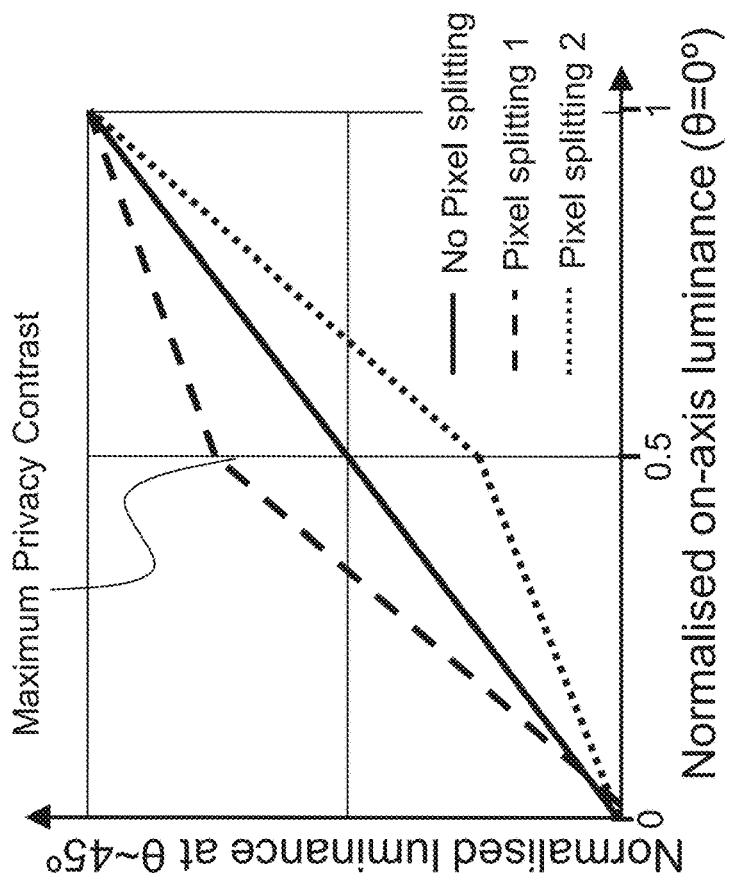
Fig. 3

Fig. 4

| Viewing Mode | Pixel 1 Normalised luminance | Pixel 2 Normalised luminance | Mean Pixel Luminance (Pixel 1 + Pixel 2)/2 | |
|---|---|---|---|---|
| | | | On-axis View | Off-axis View |
| No Pixel Splitting | L=0.5 | L=0.5 | L=0.5 | L=0.5 |
| Pixel Splitting 1 | L=1 | L=0 | L=0.5 | L=0.7 |
| Pixel Splitting 2 | L=0 | L=1 | L=0.5 | L=0.3 |

Fig. 6

| Viewing Mode | Pixel 1 Normalised luminance | Pixel 2 Normalised luminance | Mean Pixel Luminance (Pixel 1+ Pixel 2)/2 | |
|---|---|---|---|---|
| | | | On-axis View | Off-axis View |
| No Pixel Splitting | L=0.5 | L=0.5 | L=0.5 | L=0.5 |
| Pixel Splitting 1 | L=0.7 | L=0 | L=0.3 | L=0.5 |
| Pixel Splitting 2 | L=0.3 | L=1 | L=0.7 | L=0.5 |

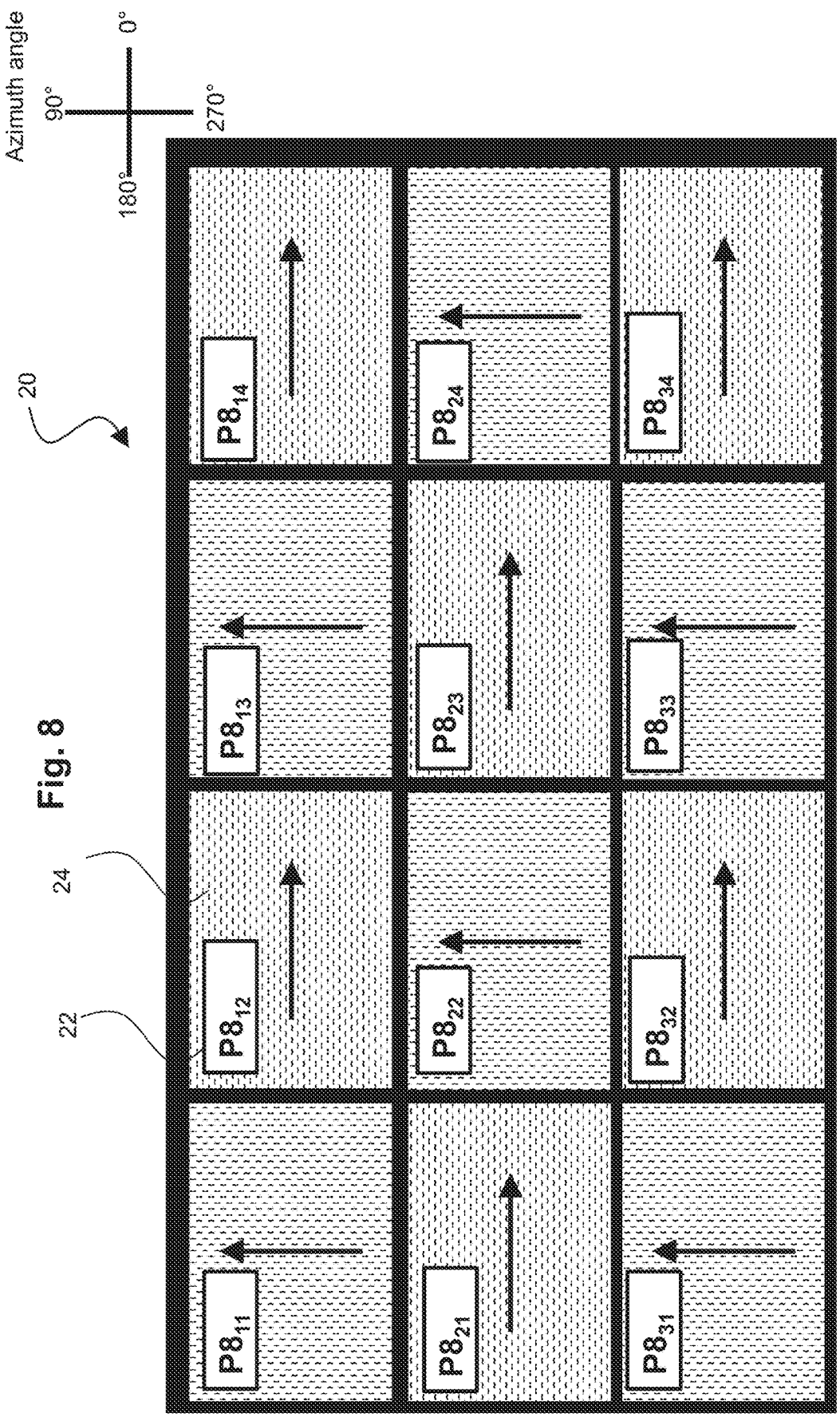

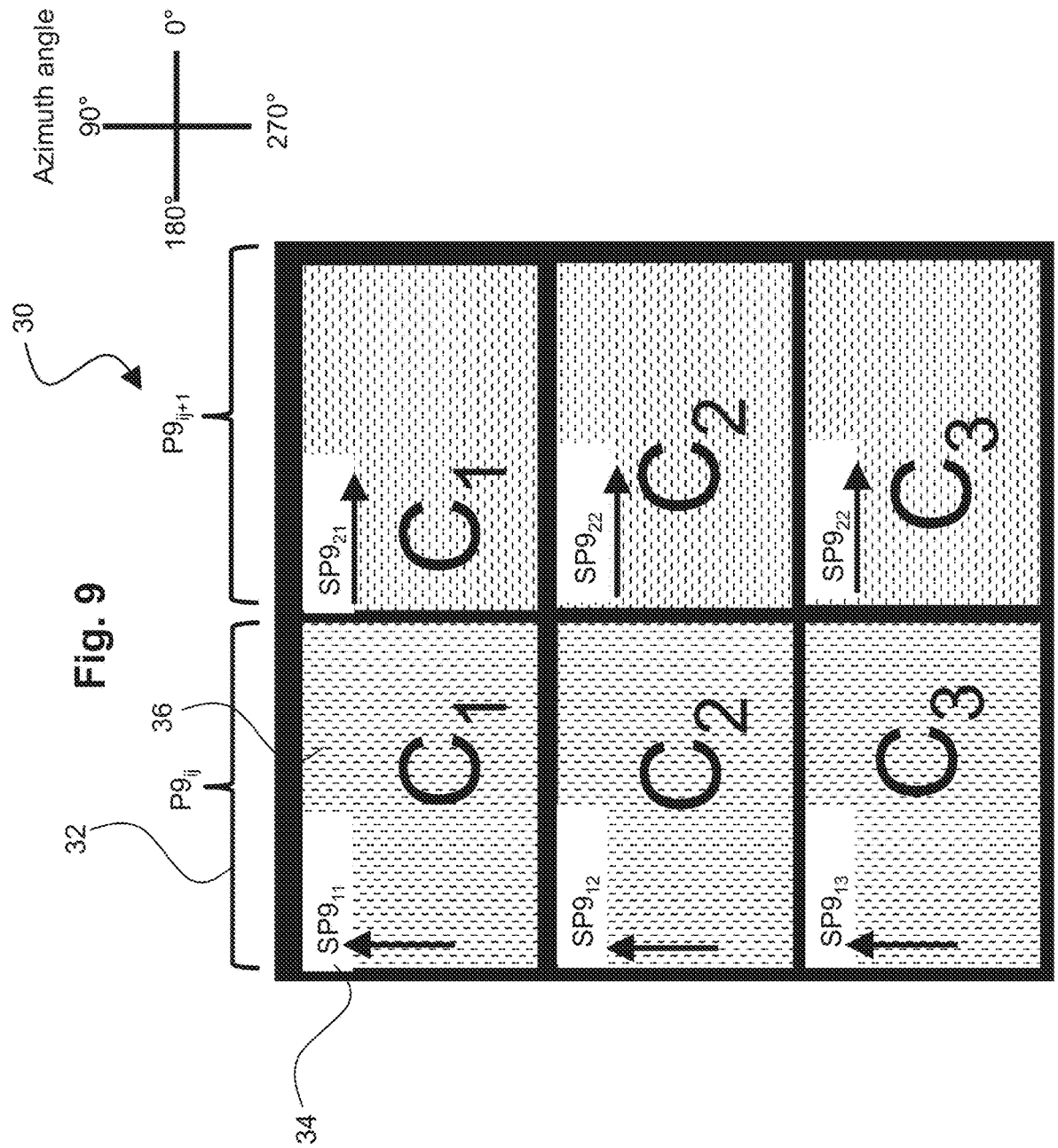

SOFTWARE PRIVACY FOR QLED DISPLAY

TECHNICAL FIELD

The present application relates to quantum dot light-emitting diode (QLED) display devices, and in particular to systems and methods for implementing a veil view privacy mode in QLED display device.

BACKGROUND ART

There are a number of conventional configurations of emissive display devices, such as for example quantum dot light-emitting diode (QLED) displays, that include optical cavities in the LED structure to generate a cavity effect for extraction of light. For example, US 2006/0158098 (Raychaudhuri et al., published Jul. 20, 2006) and U.S. Pat. No. 9,583,727 (Cho et al., issued Feb. 28, 2017) describe examples of QLED structures with light-emitting regions between reflective areas one of which is partially transmitting to emit light. Methods for improving the luminance of such optical cavities include, for example, U.S. Pat. No. 8,894,243 (Cho et al., issued Nov. 25, 2014), which describes the use of microstructure scattering for improving efficiency, and WO 2017/205174 (Freier et al., published Nov. 30, 2017), which describes enhancement of the light emission by use of surface plasmon nanoparticles or nanostructures in the charge transport layers. Chang et al., U.S. 2019/0280232 (published Sep. 12, 2019) discloses various configurations of a quantum dot emissive layer that includes both emissive quantum dots and non-emissive quantum dots.

In addition, in QLED display devices the emissive particles may be fashioned as elongated "quantum rods" rather than more circular quantum dots to emit light. Quantum rod alignment layers may be incorporated into the QLED structure to provide a particular alignment of quantum rods to affect light output as may be suitable for a particular application.

In various uses of display devices, it has become desirable to implement a privacy viewing mode, whereby an off-axis viewer sees a different image as compared to an on-axis viewer. For privacy, the off-axis image may be an obscured or veiled image, often called a "veil view", relative to the on-axis image so that the off-axis viewer cannot see meaningful image content. One method of generating a veil view privacy mode is a software implementation whereby the emission of the pixels is controlled to generate the veil view by image processing. For example, Smith et al., U.S. 2011/0175936 (published Jul. 21, 2011) teaches multiplexing pixels to create off-axis versus on-axis images of different luminance to provide the veil view. In particular, a pixel splitting method is employed whereby pixels that have different luminance values on-axis versus off-axis are driven to generate different on-axis and off-axis combinations of luminance values corresponding to different on-axis and off-axis views. Smith et al. does not relate to QLED or other emissive displays, and thus comparable principles have not been applied to generate a veil view privacy mode in a QLED display.

SUMMARY OF INVENTION

There is a need in the art, therefore, for a software privacy mode implementation that can be used in connection with QLED display devices. Embodiments of the present application pertain to systems and methods for an effective software implementation of a veil view privacy viewing mode in a quantum rod light-emitting diode (Qrod LED) display device. For such implementation, pixel multiplexing, also referred to as pixel splitting, is used to vary the on-axis versus the off-axis luminance. Adjacent pixels (or subpixels) have quantum rods with different alignment directions, which results in different luminance of the different adjacent pixels (or subpixels) based on viewing direction. Because of such difference in luminance based on viewing direction, the pixels (or subpixels) can be driven using a pixel spitting method to generate a difference in luminance of an off-axis image versus an on-axis image to implement a veil view privacy viewing mode.

With no pixel splitting, different adjacent pixels are set to have the same luminance values and hence the same average luminance irrespective of viewing angle. With pixel splitting, the pixels are driven to have different luminance values, for example with the different luminance values resulting in the same average luminance on-axis as with no pixel splitting, but resulting in different average off-axis luminance values. Because of differences in off-axis luminance relative to on-axis luminance based on the different quantum rod alignment in adjacent pixels (or subpixels), the average off-axis luminance with pixel splitting is not equal to the average off-axis luminance without pixel splitting situation. Consequently, contrast based on viewing direction between pixels that have not undergone splitting and pixels that have undergone splitting is evident. In an exemplary embodiment, a first pair of pixel elements with a given degree of pixel splitting can be arranged to have the same on-axis luminance but a different off-axis luminance as a second pair of pixel elements, whereby the second pair of pixel elements has a different degree of pixel splitting relative to the first pair of pixel elements. In another exemplary embodiment, a first pair of pixel elements with a given degree of pixel splitting can be arranged to have the same off-axis luminance but a different on-axis luminance as a second pair of pixel elements, whereby the second pair of pixel elements has a different degree of pixel splitting relative to the first pair of pixel elements.

An aspect the invention, therefore, is a display device that employs a patterned quantum rod layer having pixel elements driven by pixel splitting to generate a privacy viewing mode. In exemplary embodiments, the display device includes a patterned quantum rod layer comprising first pixel elements including first quantum rods wherein the first quantum rods are aligned in a first alignment direction, and second pixel elements including second quantum rods wherein the second quantum rods are aligned in a second alignment direction different from the first alignment direction. An electronic controller is configured to perform pixel splitting whereby the electronic controller drives the first pixel elements and the second pixel elements such that the patterned quantum rod layer has an off-axis luminance different from an on-axis luminance to generate a privacy viewing mode. The first alignment direction may be oriented 90° relative to the second alignment direction.

Another aspect of the invention is a method of operating a display device that employs driving pixel elements of a patterned quantum rod layer by pixel splitting to generate a privacy viewing mode. In exemplary embodiments, the method of operating a display device includes the steps of driving first pixel elements of a patterned quantum rod layer, wherein the first pixel elements include first quantum rods that are aligned in a first alignment direction; driving second pixel elements of the patterned quantum rod layer, wherein the second pixel elements include second quantum rods that are aligned in a second alignment direction different from the first alignment direction; and driving the first pixel elements and the second pixel elements comprises pixel splitting whereby the first pixel elements and the second pixel elements are driven such that the patterned quantum rod layer has an off-axis luminance different from an on-axis luminance to generate a privacy viewing mode. The pixel splitting may include driving a first portion of the first pixel elements and the second pixel elements with a first pixel splitting method, and driving a second portion of the first pixel elements and the second pixel elements with a second pixel splitting method, wherein the first pixel splitting method and the second pixel splitting method have different degrees of pixel splitting, or the second pixel splitting method corresponds to no pixel spitting.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 3 is a drawing depicting an exemplary method in which pixel splitting is employed to vary the on-axis versus the off-axis luminance.

FIG. 4 is a table depicting average pixel luminance for a pair of pixels based on the luminance curves shown in FIG. 3.

FIG. 6 is a table depicting average pixel luminance for a pair of pixels that is a variation of the pixel splitting of FIG. 4, in which the pixels are driven to achieve luminance values that are the same off-axis.

FIG. 8 is a drawing depicting an exemplary arrangement of a Qrod pixel array in accordance with embodiments of the present application.

FIG. 9 is a drawing depicting another exemplary arrangement of a Qrod pixel array in accordance with embodiments of the present application.

DESCRIPTION OF EMBODIMENTS

Figure 1:
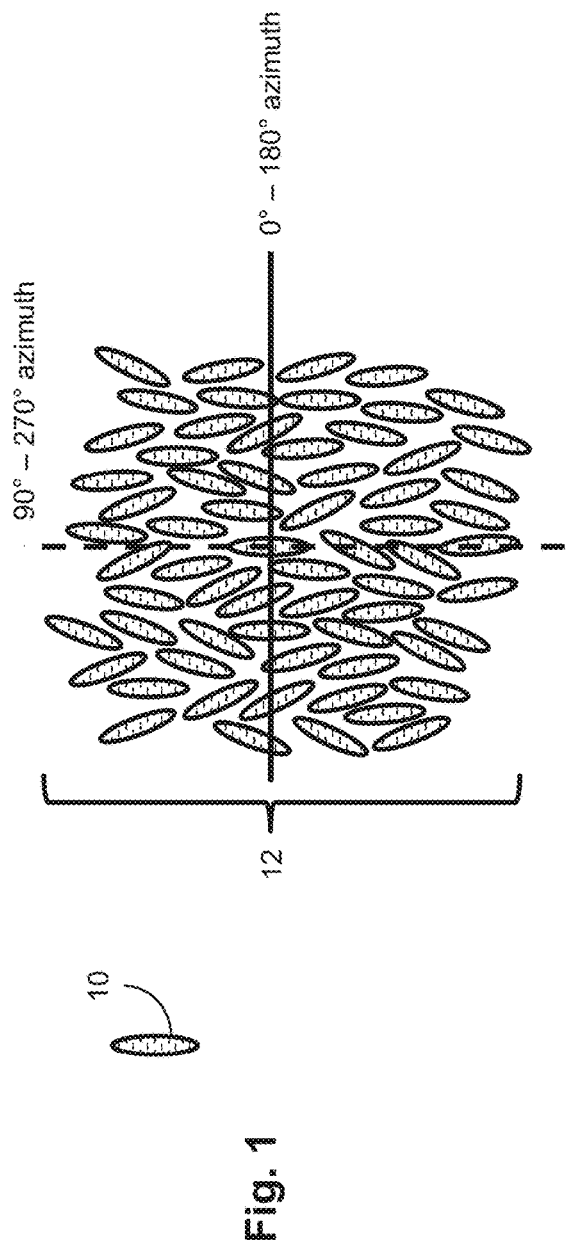
FIG. 1 is a drawing depicting orientation principles of quantum rods as may be present in a Qrod layer in a QLED device.

Embodiments of the present application will now be described with reference to the drawings, wherein like reference numerals are used to refer to like elements throughout. It will be understood that the figures are not necessarily to scale.

Embodiments of the present application pertain to systems and methods for an effective software implementation of a veil view privacy viewing mode in a quantum rod light-emitting diode (Qrod LED) display device. For such implementation, pixel multiplexing, also referred to as pixel splitting, is used to vary the on-axis versus the off-axis luminance. Adjacent pixels (or subpixels) have quantum rods with different alignment directions, which results in different luminance of the different adjacent pixels (or subpixels) based on viewing direction. Because of such difference in luminance based on viewing direction, the pixels (or subpixels) can be driven using a pixel spitting method to generate a difference in luminance of an off-axis image versus an on-axis image to implement a veil view.

The technical basis for operation of the embodiments of the present application stems from a difference in luminance based on the orientation of the quantum rods in a quantum rod (Qrod) layer, also referred to herein as the alignment of the Qrod layer or the Qrod alignment. In particular, the off-axis (non-zero zenith viewing angle) luminance of a Qrod layer depends on the difference in azimuthal angles between an observer and the principle alignment director of the quantum rods in the Qrod layer. When the observer is viewing from a zenith angle parallel to the alignment of the Qrod layer, then the Qrod layer appears brighter than when the Qrod layer is observed at a zenith angle perpendicular to the alignment direction of the Qrod layer. Because of this difference in luminance, when the Qrod alignment direction is alternated at the pixel or subpixel level, the pixels can be multiplexed to result in different off-axis and on-axis luminance of images to generate a veil view privacy viewing mode FIG. 1 is a drawing depicting orientation principles of quantum rods 10 as may be present in a Qrod layer 12 in a QLED device. Two alignment axes are depicted in FIG. 1, including a horizontal 0°-180° azimuth axis and a vertical 90°-270° azimuth axis. The quantum rod layer 12 may include a plurality of individual quantum rods 10 oriented substantially in a particular direction in accordance with a principle director. In the example depiction of FIG. 1, the quantum rod layer 12 has a nematic type alignment with a principle director of the quantum rods 10 along the 90°-270° (vertical) azimuth axis. The quantum rod layer 12 in principle could be in a state with a higher degree of ordering, for example a smectic type alignment. As an alternative alignment, the quantum rod layer 12 may have an alignment with a principle director of the quantum rods 10 along the 0°-180° (horizontal) azimuth axis.

Figure 2:
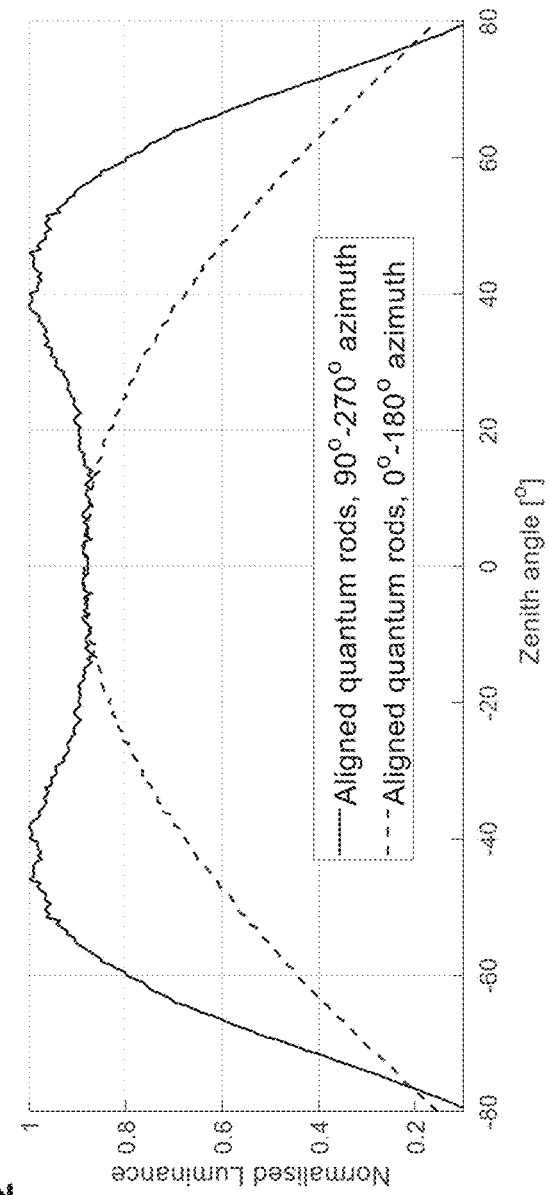
FIG. 2 is a graph depicting luminance as a function of zenith viewing angle, both for a quantum rod layer aligned along the 0°-180° azimuth axis and a quantum rod layer aligned along the 90°-270° azimuth axis.

As referenced above, the off-axis, or non-zero zenith angle, luminance of a Qrod layer depends on the difference in azimuthal angles between an observer and the Qrod layer alignment. FIG. 2 is a graph depicting normalized luminance as a function of zenith viewing angle, both for a quantum rod layer aligned along the 0°-180° azimuth axis and a quantum rod layer aligned along the 90°-270° azimuth axis. Accordingly, FIG. 2 illustrates plots of the luminance curves observed for a variation of the zenith angle based on the different alignments of the quantum rod layer. As seen in FIG. 2, the normalized luminance curves for the 0°-180° axis aligned Qrod layer and the 90°-270° axis aligned Qrod layer are different.

Specifically, while the luminance levels around 0° zenith angle (on-axis) are substantially identical for both Qrod layer alignments, the off-axis luminance curves away from the 0° zenith angle differ substantially. In particular, for most of the depicted zenith viewing angle range of negative 80° to positive 80° depicted in FIG. 2, the luminance of the Qrod layer aligned with a principle director along the 90°-270° axis has a significantly greater luminance when viewed from the 90°-270° plane as compared to the luminance when viewed from the 0°-180° plane. Consequently if a first Pixel 1 has a quantum rod layer with a principle director along the 90°-270° azimuth angle axis, and a second adjacent Pixel 2 has a quantum rod layer with a principle director along the 0°-180° azimuth angle axis, these pixels can be multiplexed to cause different images to be observed at the zero versus non-zero zenith viewing angles.

FIG. 3 is a drawing depicting an exemplary method in which pixel multiplexing, also referred to as pixel splitting, is employed to vary the on-axis versus the off-axis luminance. Pixel splitting is illustrated for a first Pixel 1 that has a quantum rod layer with a principle director along the 90°-270° azimuth angle axis, and a second adjacent Pixel 2 that has a quantum rod layer with a principle director along the 0°-180° azimuth angle axis. Normalized off-axis luminance (in this example at a zenith viewing angle of approximately 45°) is plotted as a function of the normalized on-axis luminance (at a zenith viewing angle of 0°). The graph shows the on-axis and off-axis luminance variations for three conditions including no pixel splitting, a first method of pixel splitting denoted Pixel Splitting 1, and a second method of pixel splitting denoted Pixel Splitting 2. The off-axis direction is defined along the 0°-180° azimuth angle.

The three different cases of pixel splitting are defined in the manner of driving Pixel 1 and Pixel 2, normalized such that a "0" state corresponds to a pixel being off and a "1" state corresponds to a pixel being fully on. When no pixel splitting method is used, the luminance values for both pixels are kept the same. The pixels are driven in a specified manner to generate the luminance values of Pixel Splitting 1 and Pixel Splitting 2. As defined in this example, for Pixel Splitting 1 the luminance of Pixel 2 is =0 (fully off) until the luminance of Pixel 1 is =1 (fully on); for Pixel Splitting 2 the luminance of Pixel 1 is =0 (fully off) until the luminance of Pixel 2 is =1 (fully on). The three categories of pixel splitting can be expressed mathematically by the following. The normalized on-axis luminance for no pixel splitting ($L_{NPS}$) can be expressed as:

$$L_{NPS}(\theta = 0) = \frac{L_{p1} + L_{p2}}{2}.$$

where $L_{p1}$ is the luminance of Pixel 1 and $L_{p2}$ is the luminance of Pixel 2. In the non-pixel splitting case, $L_{p1}=L_{p2}$ which gives:

$$L_{NPS}(\theta=0)=L_{p1}.$$

For Pixel Splitting 1 ($L_{ps1}$) the normalized on-axis luminance can be expressed as:

$$\text{if } L_{p1} < 1, L_{p2} = 0, L_{ps1}(\theta = 0) = \frac{L_{p1}}{2},$$
$$\text{if } L_{p1} = 1, L_{ps1}(\theta = 0) = \frac{1 + L_{p2}}{2}.$$

For Pixel Spitting 2 ($L_{ps2}$) the normalized on-axis luminance can be expressed as:

$$\text{if } L_{p2} < 1, L_{p1} = 0, L_{ps1}(\theta = 0) = \frac{L_{p2}}{2},$$
$$\text{if } L_{p2} = 1, L_{ps2}(\theta = 0) = \frac{1 + L_{p1}}{2}.$$

The driving methods for the pixel splitting methods defined above result in the luminance curves depicted in FIG. 3. The minimum normalized luminance occurs when both pixels are in the off "0" state, and the maximum normalized luminance occurs when both pixels are in the fully on "1" state. When no pixel splitting is used, as referenced above the luminance values of Pixel 1 and Pixel 2 are kept the same, and thus the normalized on-axis luminance equals the normalized off-axis luminance. In contrast, for the pixel driving methods indicated above for both Pixel Splitting 1 and Pixel Splitting 2, the normalized on-axis luminance differs from the normalized off-axis luminance, with the maximum level of contrast between normalized off-axis luminance and normalized on-axis luminance indicated in FIG. 3 where the normalized on-axis luminance and the normalized off-axis luminance differ most. The differences in normalized off-axis luminance relative to normalized on-axis luminance in Pixel Splitting 1 and Pixel Splitting 2 can be used to generate a veil view privacy viewing mode in which an off-axis viewer sees a substantially different image as compared to an on-axis viewer.

FIG. 4 is a table depicting average pixel luminance for a pair of pixels based on the luminance curves shown in FIG.

3. In this example, the pixels are driven to achieve luminance values such that the average luminance value remains the same for the on-axis view regardless of whether, or the degree to which, pixel splitting is performed. With no pixel splitting, as referenced above Pixel 1 and Pixel 2 are set to have the same luminance values, and hence the same average luminance on-axis. In addition, the average on-axis luminance equals the average off-axis luminance with no pixel splitting. This, for example, can correspond to a normal viewing or non-privacy viewing mode in which an image will be viewed the same by both an on-axis and an off-axis viewer. With pixel splitting methods, Pixel 1 and Pixel 2 are driven to have different luminance values, and when combined in this example result in the same average luminance on-axis as with no pixel splitting. As a practical matter, it may desirable to have the same on-axis luminance without or with pixel splitting so that an on-axis viewer would not see a difference in image luminance in a privacy viewing mode as compared to a normal (non-privacy) viewing mode.

Because of the difference in off-axis luminance relative to on-axis luminance for Pixel 1 versus Pixel 2, based on the difference in Qrod layer alignment as detailed above, the resultant mean or average off-axis luminance with pixel splitting is not equal to the mean or average off-axis luminance with no pixel splitting. For example and as shown in the table of FIG. 4, the mean off-axis luminance for Pixel Spitting 1 (consistent with the luminance curve of FIG. 3) is greater than the mean off-axis luminance with no pixel splitting, and the average off-axis luminance for Pixel Spitting 2 (also consistent with the luminance curve of FIG. 3) is less than the average off-axis luminance with no pixel splitting.

Consequently, off-axis luminance contrast between a pair of pixels that has not undergone pixel splitting versus a pair of pixels that has undergone pixel splitting will be evident to a viewer. In general, a first pair of pixels with a given degree of pixel splitting can be arranged to have the same on-axis luminance but a different off-axis luminance as compared to a second pair of pixels that has undergone a different degree of pixel spitting relative to the first pair of pixels. The second pair of pixels may have undergone no pixel splitting, or a different degree of pixel splitting relative to the first pair of pixels. In this manner, the table in FIG. 4 for example illustrates that the Pixel Splitting 1 operation and the Pixel Splitting 2 operation result in identical luminance for an on-axis view, but different luminance for an off-axis view (which also each differs in off-axis luminance relative to no pixel splitting). The off-axis luminance of Pixel Splitting 1 differs from that of Pixel Splitting 2 because of the different relative azimuth angles of an observer and the principle director orientation of the Qrod layer of Pixel 1 versus Pixel 2, as detailed above with respect to FIGS. 1 and 2.

Figures 5A, 5B:
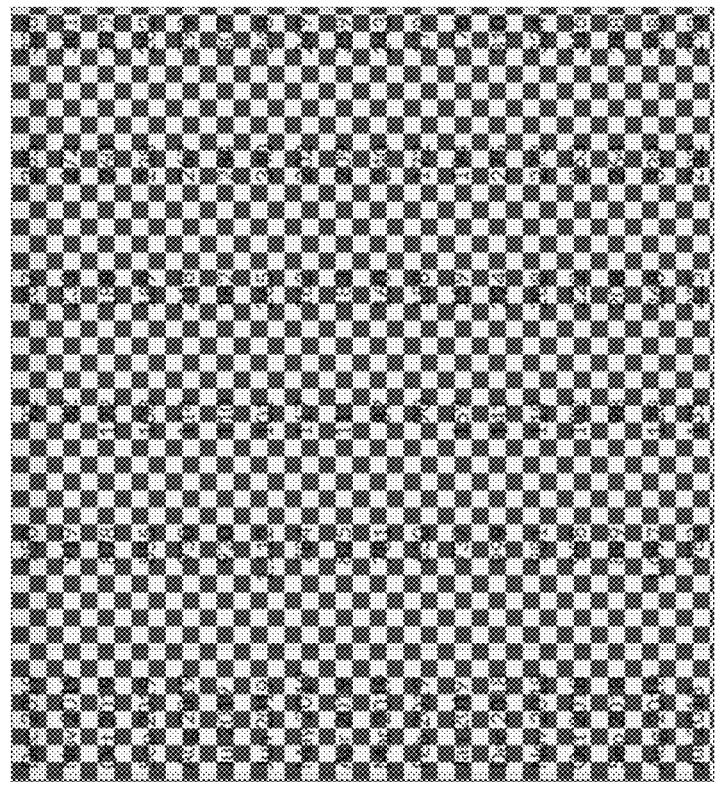
FIG. 5A and FIG. 5B are drawings depicting a simulation of an image observed on-axis (FIG. 5A) and off-axis (FIG. 5B) when the display is driven using pixel spitting of FIG. 4 to display a privacy pattern to an off-axis viewer.

FIG. 5A and FIG. 5B are drawings depicting a simulation of an image observed on-axis (FIG. 5A) and off-axis (FIG. 5B) when the display is driven using the pixel spitting of FIG. 4 to display a privacy pattern to an off-axis viewer. In this example, first areas of the display panel are driven using Pixel Splitting 1, and thus in such first areas the image to an off-axis viewer will appear brighter as compared to an on-axis viewer. Different second areas of the display panel are driven using Pixel Splitting 2, and thus in such second areas the image to an off-axis viewer will appear darker as compared to an on-axis viewer. When the first areas are alternated with second areas (each area may be one or multiple pixels), to the off-axis viewer as illustrated in FIG. 5B, the resultant overall image has a checkerboard pattern of brighter first areas and darker second areas, which obfuscates the image. Comparably as described above with respect to FIG. 4, the on-axis luminance is the same regardless of the degree of pixel splitting, and thus as shown in FIG. 5A, an on-axis viewer will see the non-obfuscated image. FIG. 5A also corresponds to the image as viewed either on-axis or off-axis when no pixel splitting is used, i.e., no privacy mode is generated or for a non-privacy viewing mode.

FIG. 6 is a table depicting average pixel luminance for a pair of pixels that is a variation of the pixel splitting of FIG. 4, in which the pixels are driven to achieve luminance values such that the average luminance value remains the same for the off-axis view regardless of whether, or the degree to which, pixel splitting is performed. Similarly as with the example of FIG. 4, with no pixel splitting Pixel 1 and Pixel 2 are set to have the same luminance values, and hence the same average luminance on-axis. In addition, the average on-axis luminance equals the average off-axis luminance with no pixel splitting. Again, no pixel splitting can correspond to a normal viewing or non-privacy viewing mode. With pixel splitting, Pixel 1 and Pixel 2 again are driven to have different luminance values, but in this example, when combined result in the same average luminance off-axis as with no pixel splitting. Because of the difference in off-axis luminance relative to on-axis luminance for Pixel 1 versus Pixel 2, based on the difference in Qrod layer alignment as detailed above, with the selected luminance values of FIG. 6 the resultant average on-axis luminance with pixel splitting is not equal to the average on-axis luminance with no pixel splitting, with the off-axis luminance being maintained as constant.

Figure 7B:
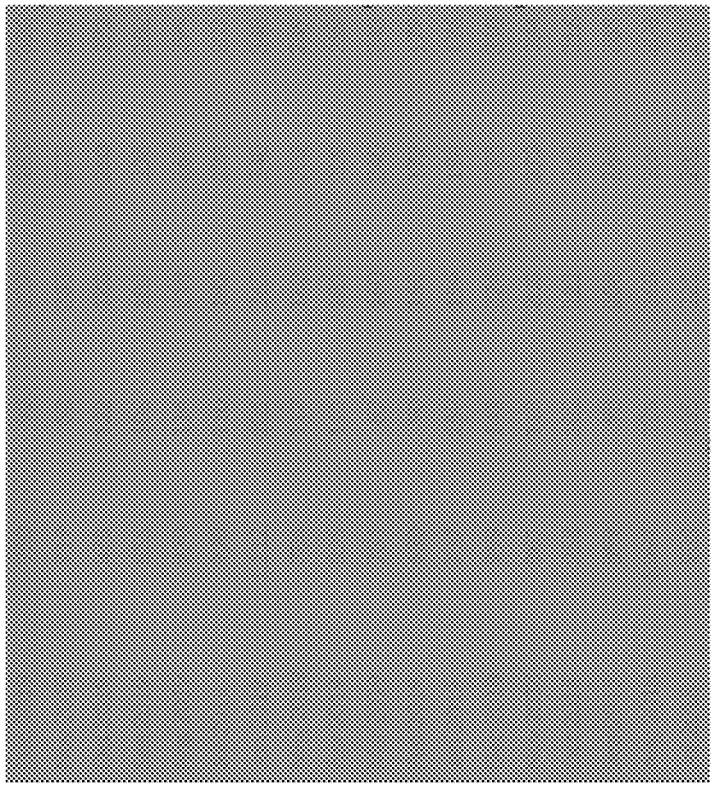
FIG. 7A and FIG. 7B are drawings depicting a simulation of an image observed on-axis (FIG. 7A) and off-axis (FIG. 7B) when the display is driven using pixel spitting in accordance with the table of FIG. 6.
Figure 7A:
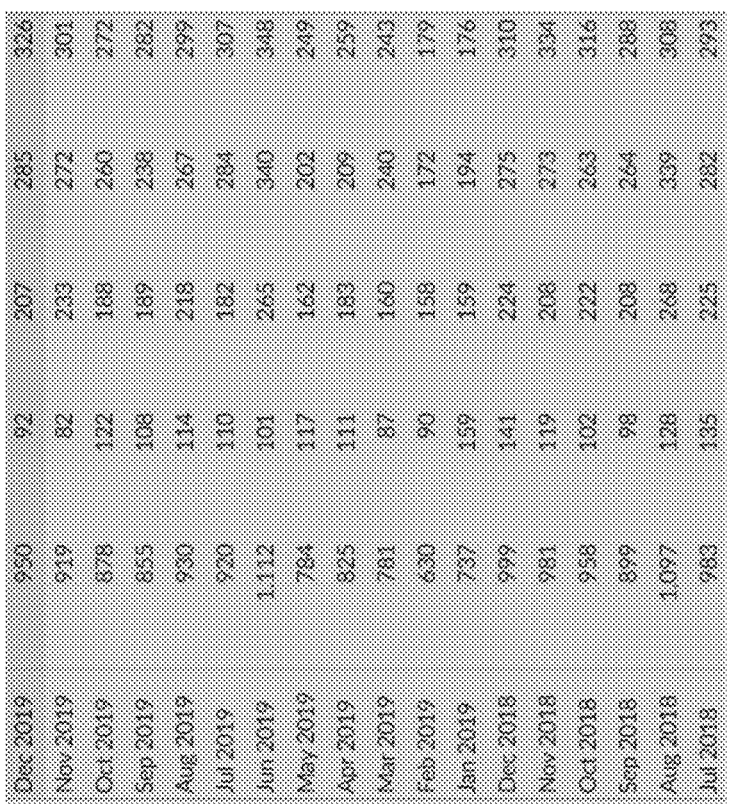

FIG. 7A and FIG. 7B are drawings depicting a simulation of an image observed on-axis (FIG. 7A) and off-axis (FIG. 7B) when the display is driven using pixel spitting in accordance with the table of FIG. 6. In this example, darker first areas of the display panel are driven using Pixel Splitting 1, and thus in such first areas the image to an off-axis viewer will appear brighter as compared to an on-axis viewer. Different second brighter areas of the display panel are driven using Pixel Splitting 2, and thus in such second areas the image to an off-axis viewer will appear darker as compared to an on-axis viewer. The result is that to the off-axis viewer as illustrated in FIG. 7B, the resultant overall image is greyed out insofar as darker image areas are brightened and brighter image areas are darkened. Accordingly, the off-axis viewer sees essentially a solid grey image as shown in FIG. 7B.

FIG. 8 is a drawing depicting an exemplary arrangement of a Qrod pixel array 20 in accordance with embodiments of the present application. The Qrod pixel array 20 includes a plurality of individual pixel elements 22 arranged in an array or matrix of "i" rows by "j" columns. In the depiction of FIG. 8, each individual pixel element 22 is denoted by an array position $P8_{ij}$. In this particular example, i=1, 2, 3 and j=1, 2, 3, 4, and thus the Qrod pixel array 20 includes individual pixel elements $P8_{11}$ to $P8_{34}$, although it will be appreciated that any number of pixel elements may be employed as is suitable for a given application. As illustrated in FIG. 8, in this example the pixel elements 22 are patterned to alternate on a row and column basis to have the principal alignment director of the quantum rods 24 aligned along the 0°-180° axis versus the 90°-270° axis, as denoted by the arrows in the figure. The alignments of the quantum rods 24 may be implemented using any suitable processing methods, as are known in the art. This configuration of patterning the Qrod alignment results in a principle privacy axis along the 0°-180° and 90°-270° axes.

Each of the individual pixel elements 22 may be a "white" pixel that includes three or more subpixels (for example combining red, green, and blue subpixels). In one example based on FIG. 8, therefore, the alternation of the Qrod alignment is configured at the pixel level. In another example based on FIG. 8, each of the individual pixel elements 22 may be an individual subpixel (e.g., a red, green, or blue subpixel by itself), with multiple subpixels being combined into a broader pixel. In such example, therefore, the alternation of the Qrod alignment is configured at the subpixel level.

Different arrangements of the Qrod alignment may be employed. For example, FIG. 9 is a drawing depicting another exemplary arrangement of a Qrod pixel array 30 in accordance with embodiments of the present application. The Qrod pixel array 30 includes a plurality of pixels 32 arranged in an array or matrix of "i" rows by "j" columns. For purposes of simplified illustration, in this example only two pixels 32, $P9_{ij}$ and $P9_{ij+1}$, are shown. Each of the pixels 32 includes three individual subpixels 34 arranged on a column basis, i.e. pixel $P9_{ij}$ includes three subpixels $SP9_{11}$, $SP9_{12}$, and $SP9_{13}$, and pixel $P9_{ij+1}$ includes three subpixels $SP9_{21}$, $SP9_{22}$, and $SP9_{23}$. Each of the subpixels 34 may emit a different color of light, denoted in FIG. 9 generally as $C_1$, $C_2$, and $C_3$. For example, $C_1$, $C_2$, and $C_3$ respectively may correspond to red, green, and blue subpixels. As illustrated in FIG. 9, in this example the subpixels 34 are patterned on a pixel basis to have the principal director of the quantum rods 36 aligned along the 0°-180° axis versus the 90°-270° axis, as denoted by the arrows in the figure. In other words, the Qrod alignment in FIG. 9 is configured on a pixel basis, with each of the subpixels within a given pixel having the same Qrod alignment or principle director. It should be noted that while the color order of the subpixels (C1 C2 C3) is shown to be identical for pixels P9ij and P9ij+1, this is not necessary. Having the same color ordering for adjacent pixels may have advantages, such as for example for ease of manufacturing, but having a different color ordering for adjacent pixels also may have advantages, such as for example to avoid color artifacts.

Figure 10:
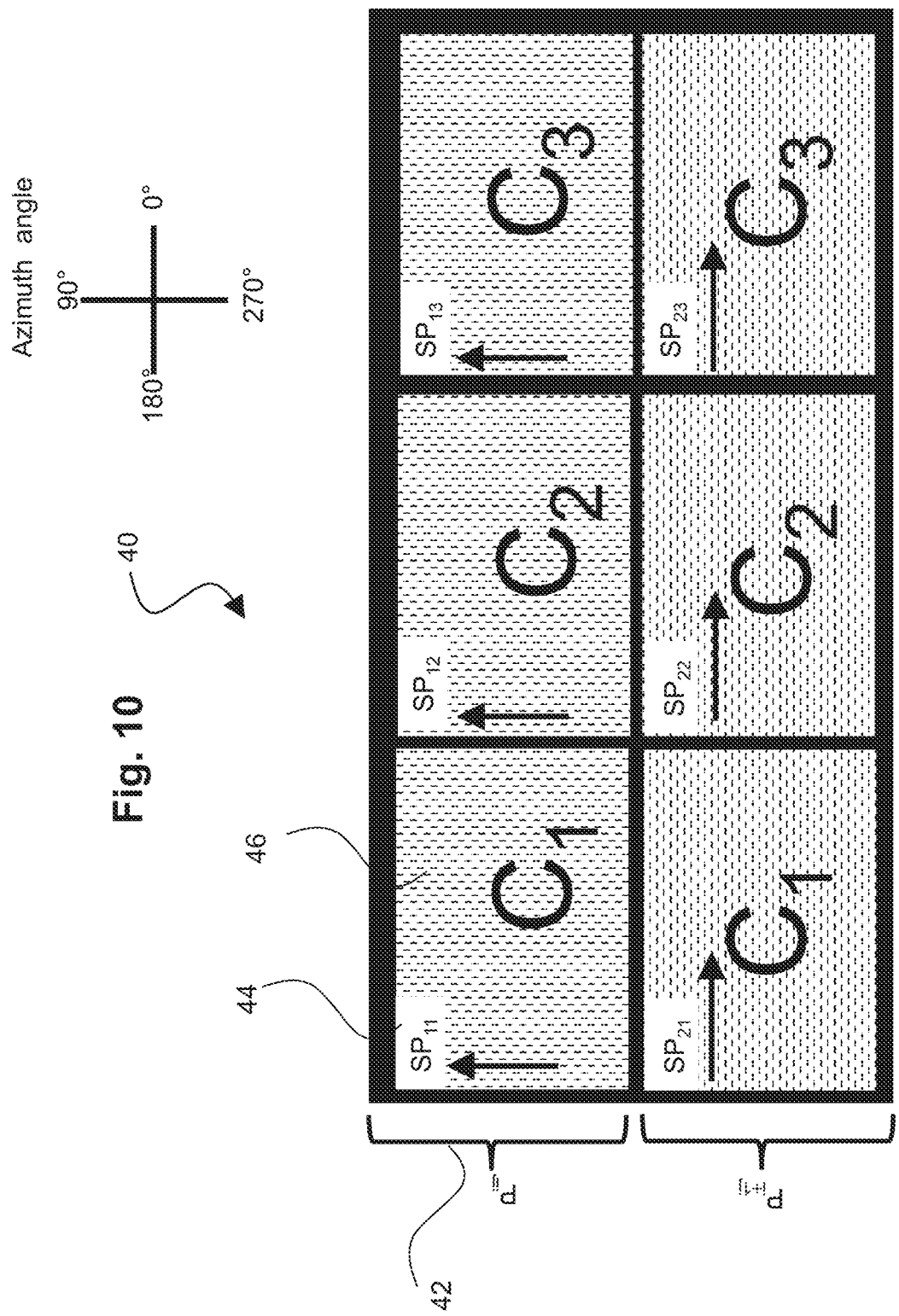
FIG. 10 is a drawing depicting another exemplary arrangement of a Qrod pixel array in accordance with embodiments of the present application.

FIG. 10 is a drawing depicting another exemplary arrangement of a Qrod pixel array 40 in accordance with embodiments of the present application. The embodiment of FIG. 10 is similar to that of FIG. 9, except in the embodiment of FIG. 10 the pixels are arranged on a row basis. Accordingly, the Qrod pixel array 40 includes a plurality of pixels 42 arranged in an array or matrix of "i" rows by "j" columns. For purposes of simplified illustration, in this example two pixels 42, $P_{ij}$ and P are shown. Each of the pixels 42 includes three individual subpixels 44 arranged on a row basis, i.e. pixel $P_{ij}$ includes three subpixels $SP_{11}$, $SP_{12}$, and $SP_{13}$, and pixel $P9_{i+1j}$ includes three subpixels $SP_{21}$, $SP_{22}$, and $SP_{23}$. Each of the subpixels 44 may emit a different color of light, denoted in FIG. 10 generally as $C_1$, $C_2$, and $C_3$ (e.g., red, green, and blue subpixels). As illustrated in FIG. 10, in this example the subpixels 44 again are patterned on a pixel basis, but with the subpixels now arranged by row, to have the principal director of the quantum rods 46 aligned along the 0°-180° axis versus the 90°-270° axis, as denoted by the arrows in the figure. In other words, the Qrod alignment in FIG. 10 also is configured on a pixel basis, with each of the subpixels within a given pixel having the same Qrod alignment or principle director, but with the subpixels positioned on a row basis rather than on a column basis as in FIG. 9. Similarly as above, while the color order of the subpixels (C1 C2 C3) is shown to be identical for pixels P10ij and P10i+1j, this is not necessary. Having the same color ordering for adjacent pixels may have advantages, such as for example for ease of manufacturing, but having a different color ordering for adjacent pixels also may have advantages, such as for example to avoid color artifacts.

Figure 11:
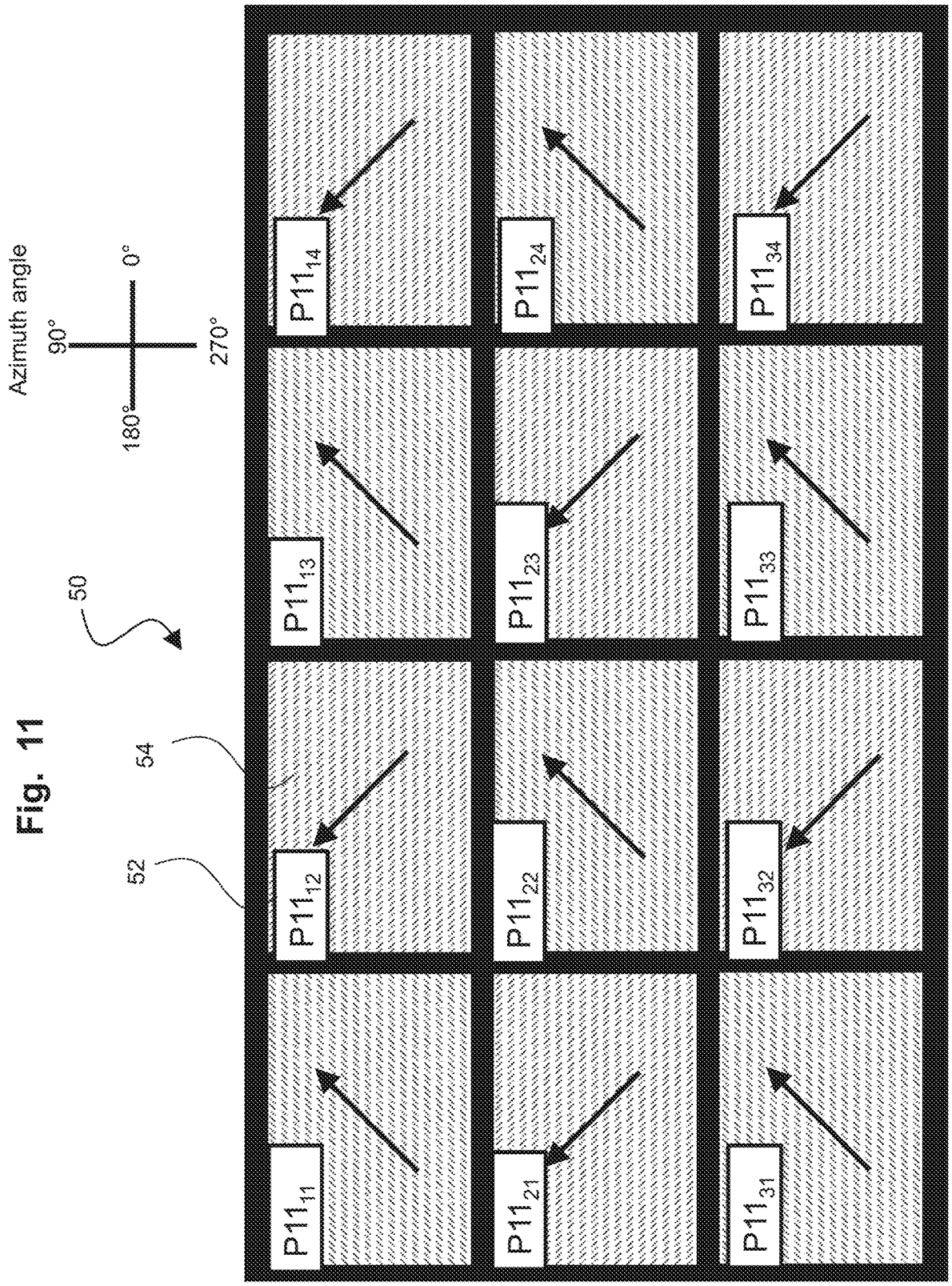
FIG. 11 is a drawing depicting another exemplary arrangement of a Qrod pixel array in accordance with embodiments of the present application.

In the previous examples, the principal alignment director of the Qrod alignment is along one of the 0°-180° versus 90°-270° axes. Other Qrod alignment directions may be employed. FIG. 11 is a drawing depicting another exemplary arrangement of a Qrod pixel array 50 in accordance with embodiments of the present application. The Qrod pixel array 50 includes a plurality of individual pixel elements 52 that are arranged comparably as depicted and described with respect to FIG. 8. As illustrated in FIG. 11, in this example the pixel elements 52 are patterned to alternate on a row and column basis to have the principal alignment director of the quantum rods 54 aligned along the 45°-225° axis versus the 135°-315° axis, as denoted by the arrows in the figure. In general, therefore, the Qrod alignment within a pixel element array includes first individual pixel elements having a first Qrod alignment, and second individual pixel elements having a second Qrod alignment different from the first Qrod alignment. In exemplary embodiments, the first and second Qrod alignments are oriented 90° relative to each other, and such relative orientation provides maximum privacy. Different relative orientations of the first and second Qrod alignments, and in particular different 90° relative orientations of the first and second Qrod alignments, commensurately will result in different privacy axes. For example, the configuration of FIG. 11 will result in principal privacy axes along the 45°-225° and 135°-315° axes. In addition, as described above with respect to FIG. 8, the individual pixel elements 52 may be overall pixels (e.g., white pixels) or individual subpixels (e.g., red, green, and blue subpixels), and any suitable arrangement of pixels and subpixels, such as described above with respect to FIGS. 9 and 10, may be employed in connection with any suitable orientation of first and second Qrod alignments.

Figure 12:
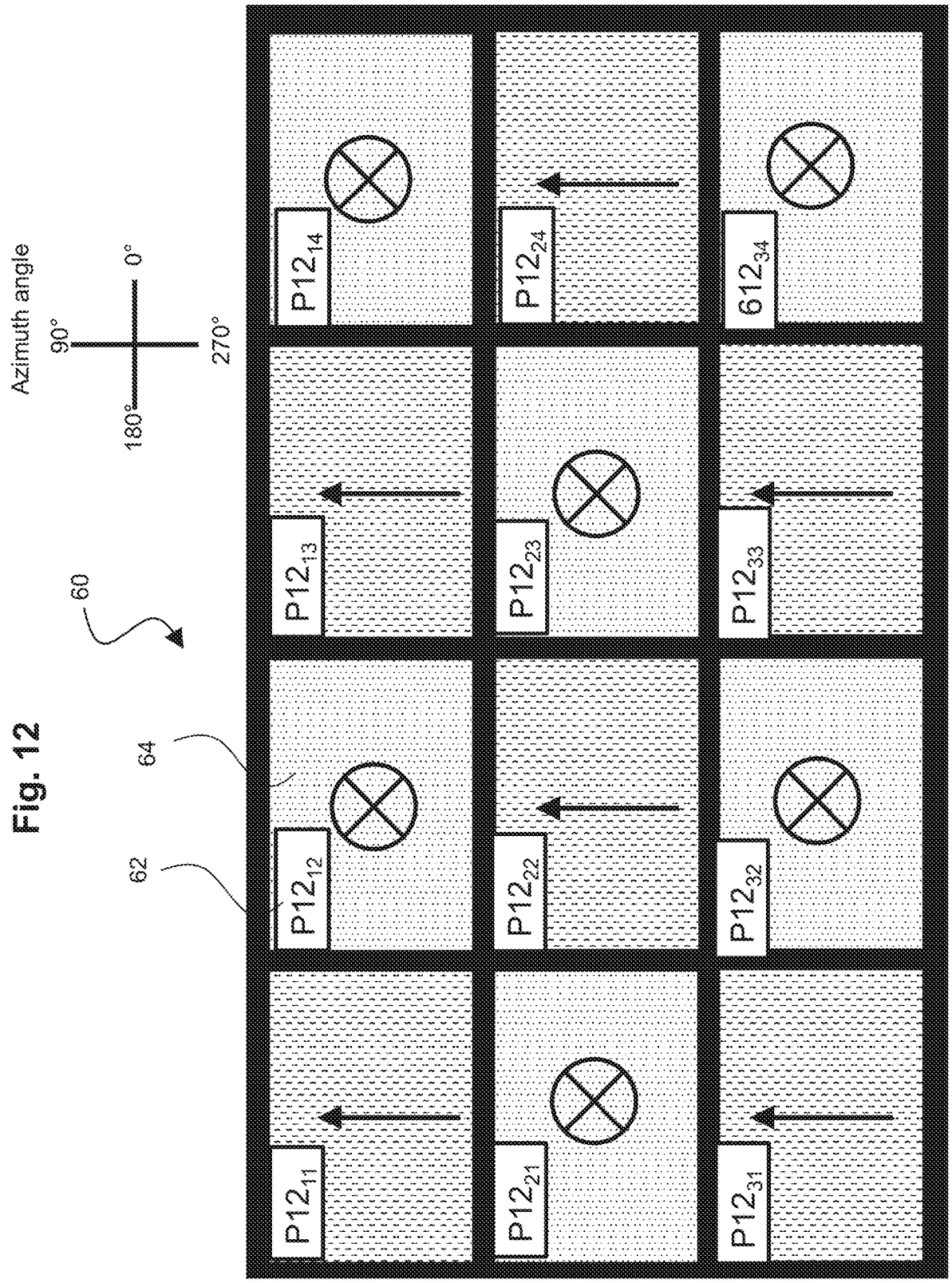
FIG. 12 is a drawing depicting another exemplary arrangement of a Qrod pixel array in accordance with embodiments of the present application.

FIG. 12 is a drawing depicting another exemplary arrangement of a Qrod pixel array 60 in accordance with embodiments of the present application. The Qrod pixel array 60 includes a plurality of individual pixel elements 62 that are arranged comparably as depicted and described with respect to FIG. 8. As illustrated in FIG. 12, in this example the pixel elements 62 are patterned to alternate on a row and column basis to have the principal alignment director of the quantum rods 64 aligned along the 90°-270° axis versus along the z-axis (out of page in the depiction of FIG. 12), as denoted by the arrows and crosses in the figure. Accordingly, such, Qrod alignment within the pixel element array 60 also includes first individual pixel elements having a first Qrod alignment, and second individual pixel elements having a second Qrod alignment different from the first Qrod alignment. In this example also the first and second Qrod alignments are oriented 90° relative to each other. The configuration of FIG. 12 will result in a principal privacy axis along the 90°-270° azimuth axis. In addition, as described above with respect to FIG. 8, the individual pixel elements 62 may be overall pixels (e.g., white pixels) or individual subpixels (e.g., red, green, and blue subpixels), and any suitable arrangement of pixels and subpixels, such as described above with respect to FIGS. 9 and 10, may be employed in connection with the first and second Qrod alignments of FIG. 12. While FIG. 12 shows the quantum rods 64 aligned along the 90°-270° axis versus along the z-axis, the specific angle of the axis is of secondary importance. Generally, one set of quantum rods is aligned in the plane of the display (in x,y plane) while the second set is aligned at a 90° angle along the z-axis. The specific angle of the first set of quantum rods is of secondary importance in that it dictates the principle privacy angles of the display.

Figure 13:
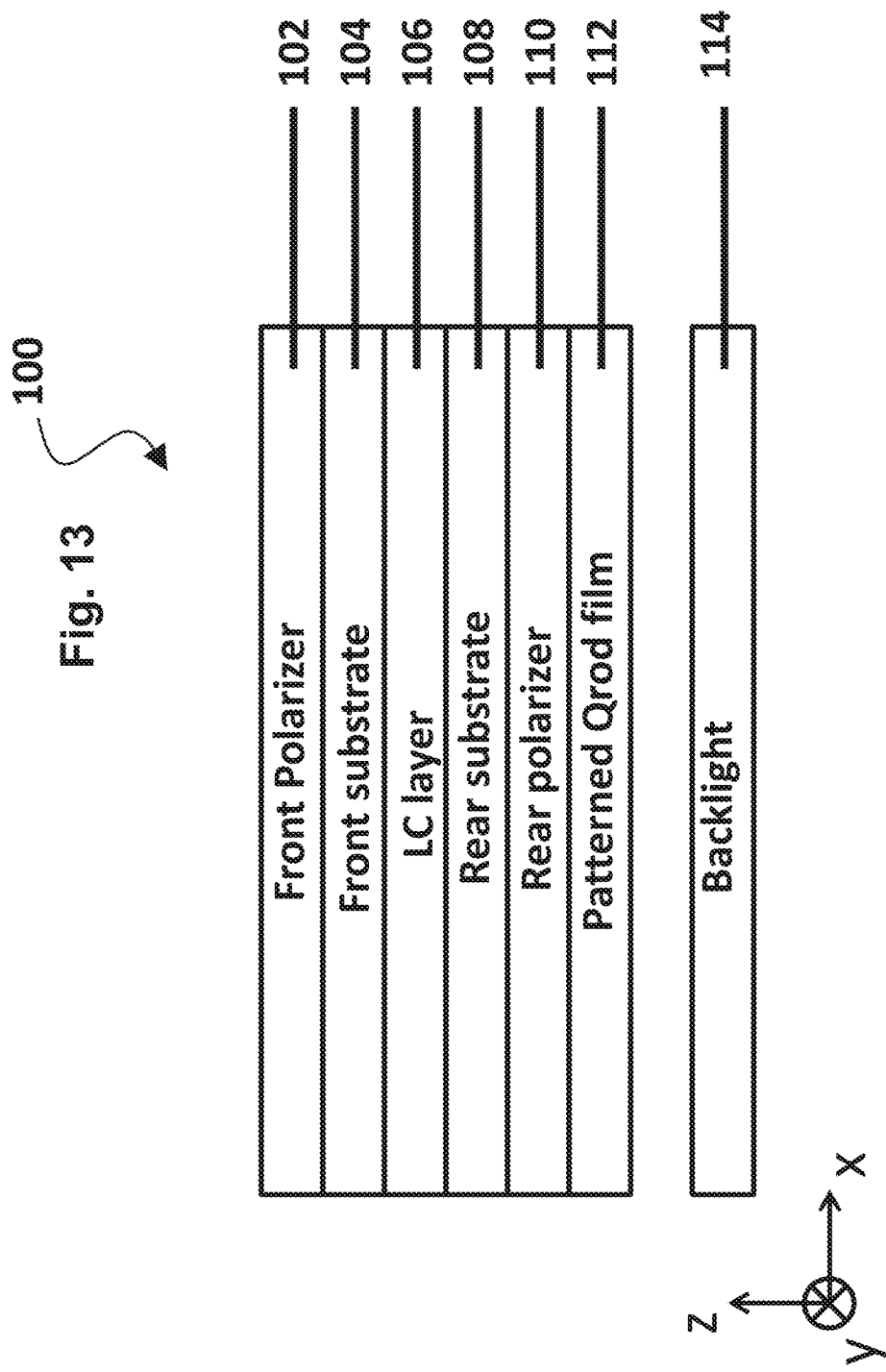
FIG. 13 is a drawing depicting an exemplary liquid crystal device (LCD) display system having a layer configuration that includes a patterned Qrod film layer in accordance with any of the embodiments.

A patterned Qrod layer or film in accordance with any of the above embodiments may be incorporated into any suitable display device structure to enable implementation of a veil view privacy mode. As used in the following figures, terms such as front/top and bottom/rear respectively are interchangeable with viewing side and non-viewing side. FIG. 13 is a drawing depicting an exemplary liquid crystal device (LCD) display system 100 having a layer configuration that includes a patterned Qrod layer or film in accordance with any of the embodiments. In the example of FIG. 13, a display system 100 includes, from a viewing side, a front polarizer 102, a front substrate 104, a transmissive type image panel liquid crystal (LC) layer 106, a rear substrate 108, a rear polarizer 110, a patterned Qrod film layer 112 according to any of the embodiments, and a backlight 114. Aside from the patterned Qrod layer 112, the other device layers may be configured in any manner suitable as used in LCD display devices. FIG. 14-17 illustrate additional example display system configurations, which generally differ from each other as to the layer ordering. Accordingly, like layers are identified in subsequent figures with like reference numerals as in FIG. 13, and the different layer orderings are as described below.

Figure 14:
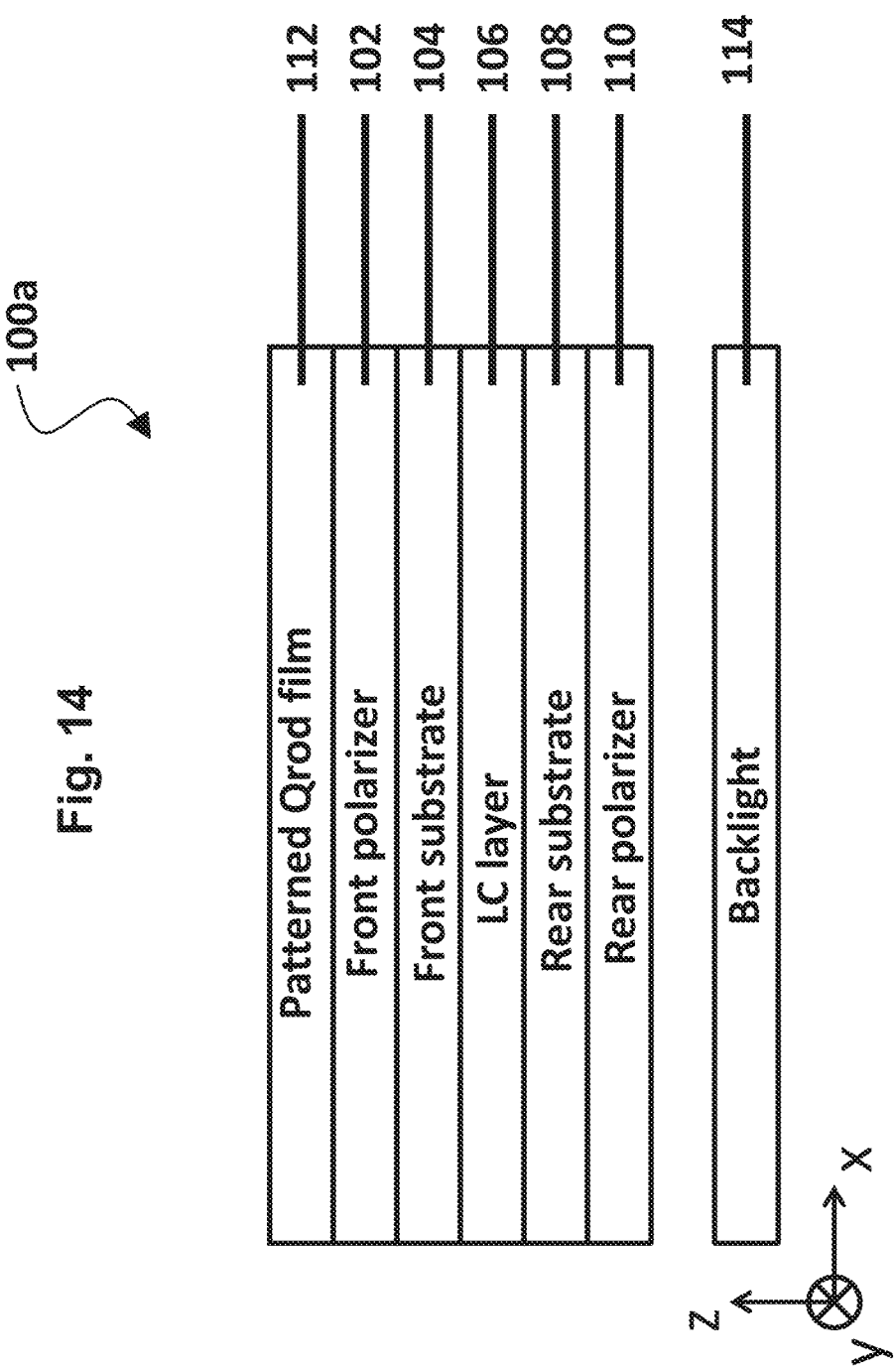
FIG. 14 is a drawing depicting another exemplary LCD display system having a layer configuration that includes a patterned Qrod film layer in accordance with any of the embodiments.
Figure 15:
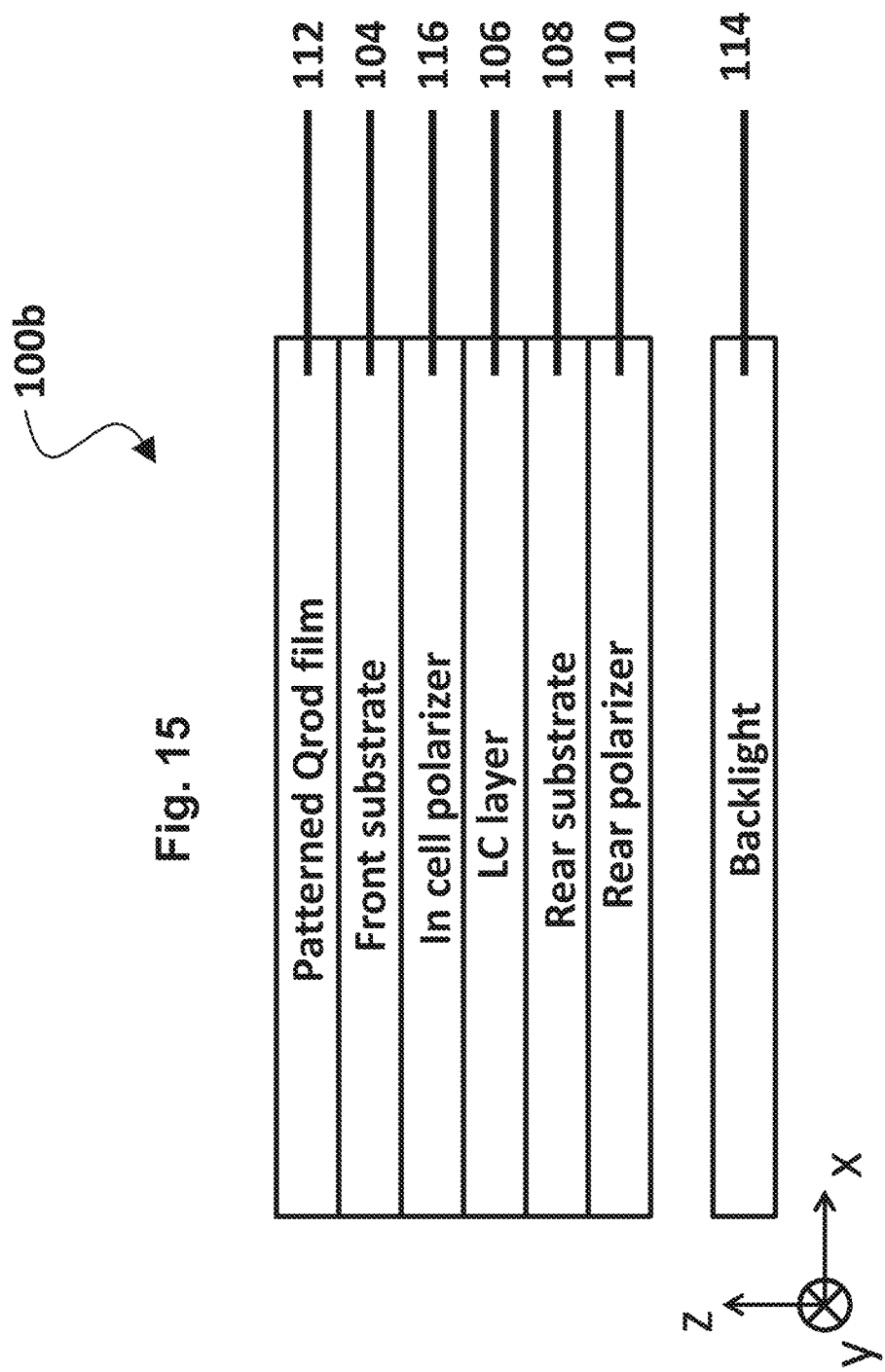
FIG. 15 is a drawing depicting another exemplary LCD display system having a layer configuration that includes a patterned Qrod film layer in accordance with any of the embodiments.
Figure 16:
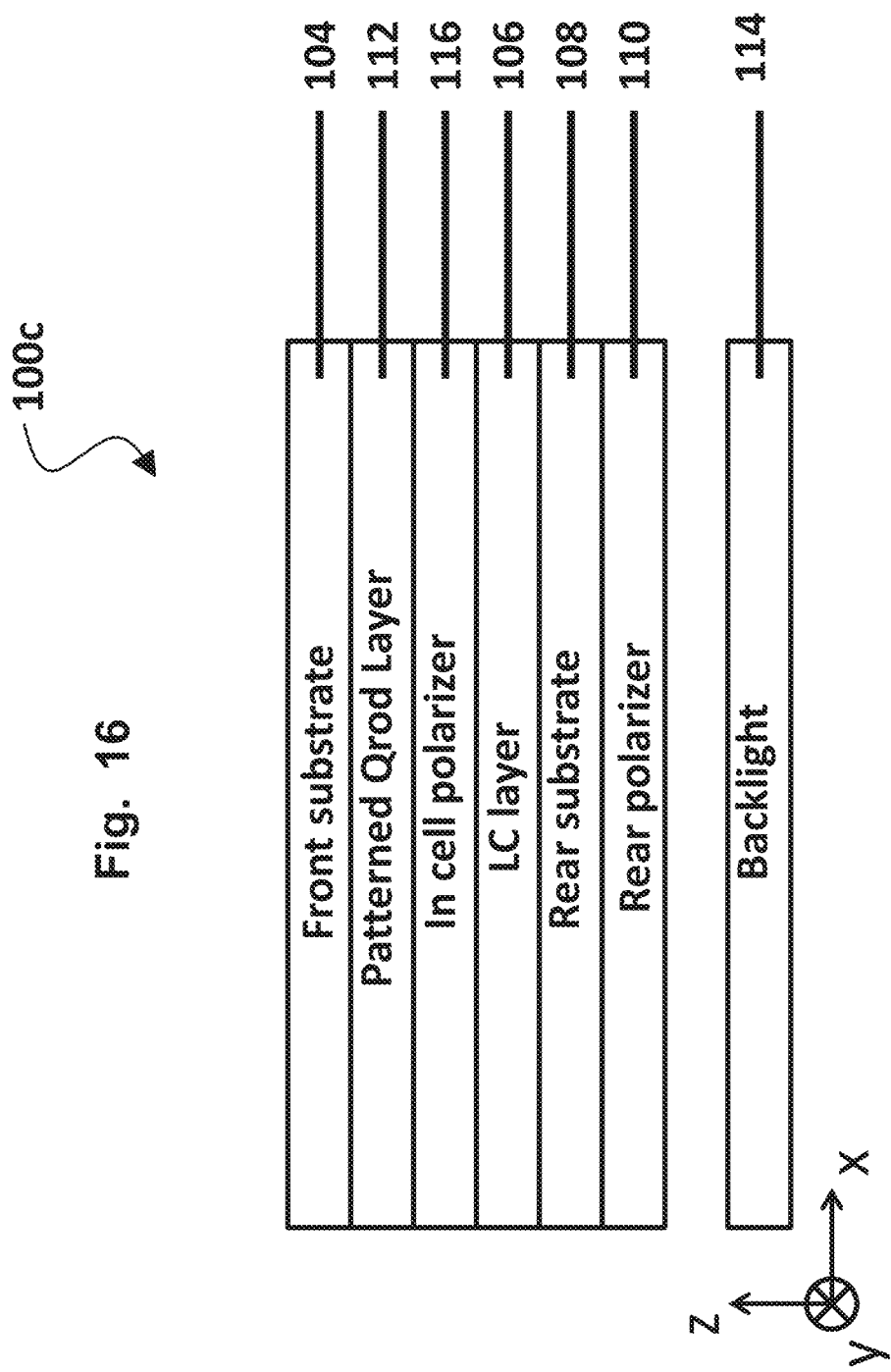
FIG. 16 is a drawing depicting another exemplary LCD display system having a layer configuration that includes a patterned Qrod film layer in accordance with any of the embodiments.
Figure 17:
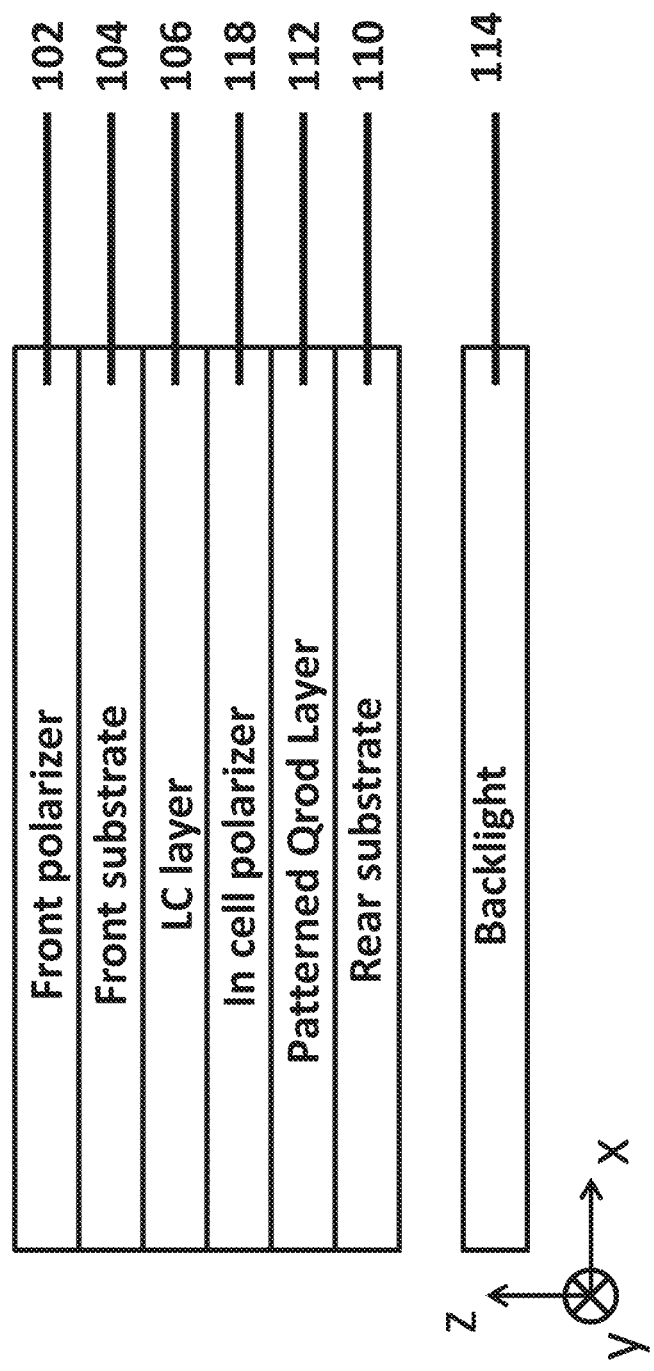
FIG. 17 is a drawing depicting another exemplary LCD display system having a layer configuration that includes a patterned Qrod film layer in accordance with any of the embodiments.

In the example display system 100a of FIG. 14, the patterned Qrod film 112 is positioned on a viewing side of the front polarizer 102, and thus is positioned on the viewing side of the entire layer stack. In the example display system 100b of FIG. 15, the patterned Qrod film 112 also is positioned on a viewing side of the front substrate 104. Instead of utilizing a front polarizer as in the previous embodiment, the display system 100b has a first polarizer 116 that is positioned as an in-cell polarizer positioned on a viewing side of the LC layer 106, and a second polarizer is the rear polarizer 110 as in the previous embodiment. A liquid crystal cell is denoted as the combined layers of the front substrate, the rear substrate, and the LC layer therebetween. In this context, the use of the term "in-cell" denotes that the pertinent layer is located between the front substrate 104 and the rear substrate 108, which along with the LC layer 106 form the LC cell. In the example display system 100c of FIG. 16, the patterned Qrod film 112 is positioned in-cell on a non-viewing side of the front substrate 104 and on a viewing side of the in-cell polarizer 116. In the example display system 100d of FIG. 17, instead of utilizing a rear polarizer as in the previous embodiment, the display system 100d has a first polarizer corresponding to the front polarizer 102, and a second polarizer 118 that is positioned as an in-cell polarizer positioned on a non-viewing side of the LC layer 106. The patterned Qrod film 112 is positioned in-cell on a viewing side of the rear substrate 108 and on a non-viewing side of the in-cell polarizer 118. Other suitable layer configurations may be employed.

The different variations may have different advantages relative to each other. For example, the embodiment of FIG. 13 may be advantageous in terms of maximizing contrast ratio and minimizing unwanted Qrod emission via stimulation by ambient light. The embodiment of FIG. 14 may be advantageous in terms of maximizing contrast ratio and brightness. The embodiment of FIG. 15 may be advantageous in terms of maximizing brightness and minimizing thickness. The embodiment of FIG. 16 may be advantageous in terms of maximizing brightness and minimizing thickness and pixel crosstalk. The embodiment of FIG. 17 may be advantageous in terms of minimizing thickness, pixel crosstalk, and unwanted Qrods emission via stimulation by ambient light. The embodiments of FIGS. 13 and 14 may also be advantageous in terms of cost.

Figure 18:
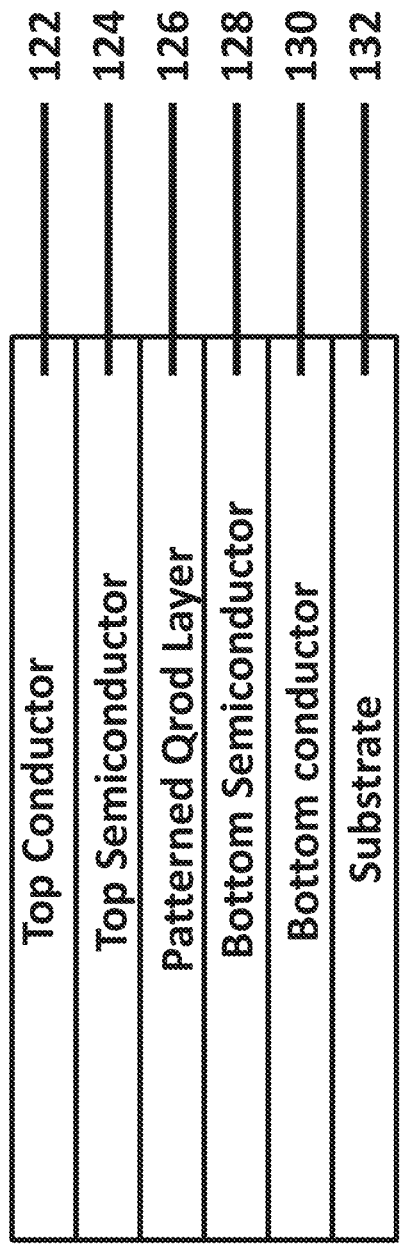
FIG. 18 is a drawing depicting an exemplary electroluminescent display system having a layer configuration that includes a patterned Qrod layer or film in accordance with any of the embodiments.

A patterned Qrod layer or film in accordance with any of the above embodiments also may be incorporated into any suitable electroluminescent display system, such as for example an electroluminescent Qrod display system, to enable implementation of a veil view privacy mode. FIG. 18 is a drawing depicting an exemplary electroluminescent display system 120 having a layer configuration that includes a patterned Qrod layer or film in accordance with any of the embodiments. In the example of FIG. 18, an electroluminescent display system 120 includes, from the viewing side, a top conductor 122, a top semiconductor 124, a patterned Qrod film layer 126 according to any of the embodiments, a bottom semiconductor 128, a bottom conductor 130, and a rear substrate 132. Aside from the patterned Qrod film layer 126, the other device layers may be configured in any manner suitable as used in electroluminescent display devices. Other suitable layer configurations may be employed.

Figure 19:
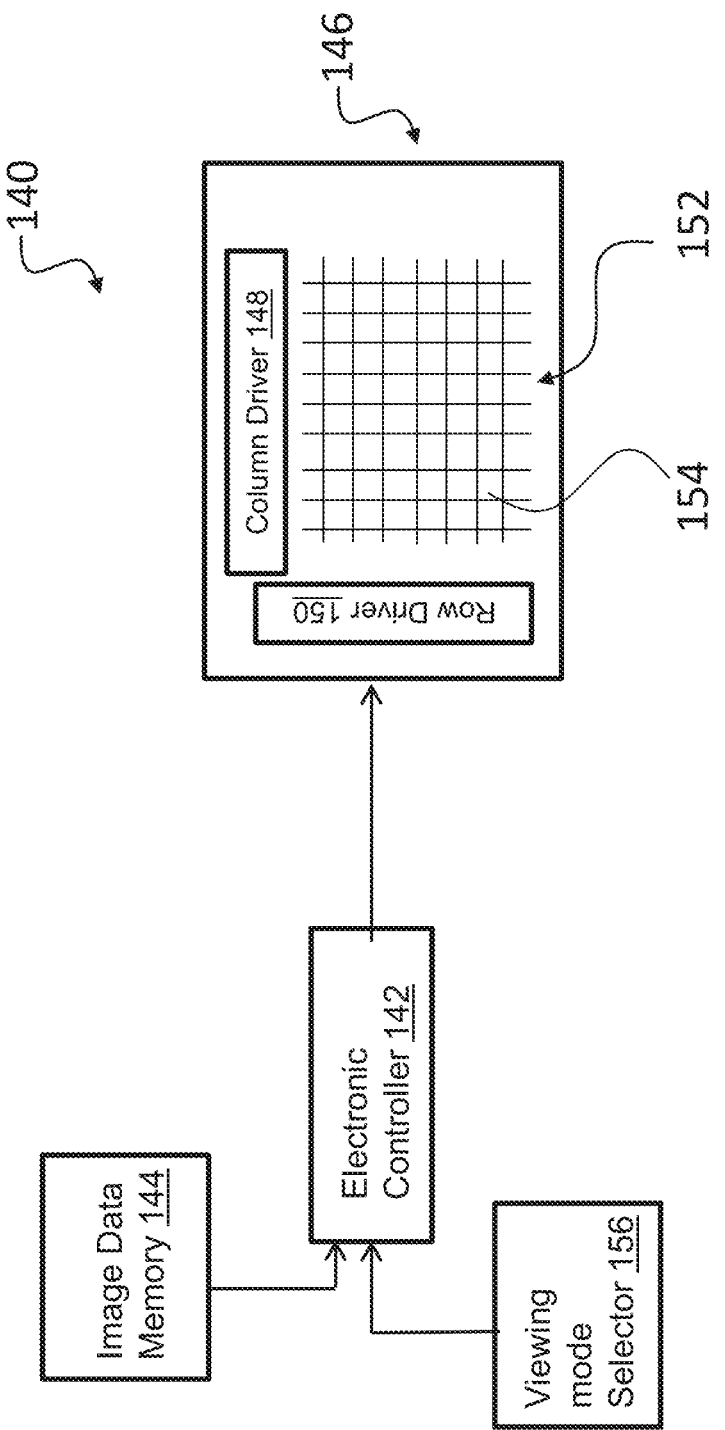
FIG. 19 is a drawing depicting a block diagram showing operative portions of an exemplary display system including a patterned Qrod layer in accordance with embodiments of the present application.

FIG. 19 is a drawing depicting a block diagram showing operative portions of an exemplary display system 140 including a patterned Qrod layer that may be configured according to any of the embodiments, and further demonstrating image display control. An electronic controller 142 uses image data which may be stored in an image data memory 144 to address the pixels of a display panel 146 using an active matrix arrangement of column drivers 148 and row drivers 150 as are commonly utilized in display devices. The display panel 146, for example, may include an LCD transmissive display device as described above in connection with FIGS. 13-17, or an electroluminescent display device as described above in connection with FIG. 18. The display panel 146 further includes a patterned Qrod layer 152 having an array of pixel elements 154, which may be pixels or subpixels, according the any of the embodiments.

The display system 140 further includes a viewing mode selector 156 that can receive an input of a viewing mode. Selectable viewing modes may include a normal, non-privacy viewing mode in which on-axis and off-axis viewers see the same image, versus one or more different types of privacy viewing modes in which on-axis and off-axis viewers see different images. For example, privacy modes may include the veil view modes such as described above with respect to FIGS. 4-7, although other variations of veil view modes may be employed. The viewing mode selector 156 may be activated via an automatic input (such as image content) or a manually controlled input (such as a button or touchscreen). The image data memory 144 may be embodied as any suitable non-transitory computer readable medium as are known in the art, such as flash memories, RAM type memory, ROM type memory, or any other suitable computer readable memory device. The electronic controller 142 and viewing mode selector 156 may be embodied as any suitable electronic or computer based control device, such as for example a microcomputer, microprocessor, CPU, integrated circuitry, combinations of hardware, software, and/or firmware, or the like, and may include a dedicated memory device also embodied as a non-transitory computer readable medium as are known in the art.

To generate a selected viewing mode, the viewing mode selector 156 provides information to the electronic controller 142 to select the desired viewing mode (non-privacy or privacy viewing mode). The electronic controller 142 simultaneously receives image data from the image data memory 144 and addresses the correct image data to the image pixels of display panel 146. The electronic controller further provides the requisite drive signals to control the driving of the pixel elements 154 of the patterned Qrod layer 152 to implement any pixel splitting algorithm corresponding to a selected privacy mode. The pixel splitting algorithm may correspond to Pixel Splitting 1 and/or Pixel Splitting 2 described above, although variations of pixel splitting may be employed to vary on-axis versus off-axis luminance in any manner to achieve a desired privacy mode. For a normal or non-privacy viewing mode, the electronic controller 142 may not implement pixel splitting corresponding to the no pixel splitting conditions described above, in which there is no variation of on-axis versus off-axis luminance of a displayed image.

An aspect the invention, therefore, is a display device that employs a patterned quantum rod layer having pixel elements driven by pixel splitting to generate a privacy viewing mode. In exemplary embodiments, the display device includes a patterned quantum rod layer comprising first pixel elements including first quantum rods wherein the first quantum rods are aligned in a first alignment direction, and second pixel elements including second quantum rods wherein the second quantum rods are aligned in a second alignment direction different from the first alignment direction. An electronic controller is configured to perform pixel splitting whereby the electronic controller drives the first pixel elements and the second pixel elements such that the patterned quantum rod layer has an off-axis luminance different from an on-axis luminance to generate a privacy viewing mode. The display device may include one or more of the following features, either individually or in combination.

In an exemplary embodiment of the display device, the first alignment direction is oriented 90° relative to the second alignment direction.

In an exemplary embodiment of the display device, the first alignment direction is along a 0°-180° azimuth axis, and the second alignment direction is along a 90°-270° azimuth axis.

In an exemplary embodiment of the display device, the first and second pixel elements are arranged in an array of rows and columns, and the first pixel elements alternate on a row and column basis with the second pixel elements.

In an exemplary embodiment of the display device, each of the first and second pixel elements is a subpixel that emits light of a single color.

In an exemplary embodiment of the display device, each of the first and second pixel elements is a white pixel including a combination of subpixels that emit light of different colors and that have a same principle director.

In an exemplary embodiment of the display device, the subpixels of a respective white pixel are arranged on a column basis.

In an exemplary embodiment of the display device, the subpixels of a respective white pixel are arranged on a row basis.

In an exemplary embodiment of the display device, the display device further includes a transmissive liquid crystal cell including a front substrate, a rear substrate, and a liquid crystal layer between the front substrate and the rear substrate.

In an exemplary embodiment of the display device, the patterned quantum rod layer is positioned in-cell between the front substrate and the rear substrate.

In an exemplary embodiment of the display device, the patterned quantum rod layer is positioned on either a viewing side or a non-viewing side of the liquid crystal cell.

In an exemplary embodiment of the display device, the patterned quantum rod layer is positioned between two semiconductor layers to form an electroluminescent display device.

Another aspect of the invention is a method of operating a display device that employs driving pixel elements of a patterned quantum rod layer by pixel splitting to generate a privacy viewing mode. In exemplary embodiments, the method of operating a display device includes the steps of driving first pixel elements of a patterned quantum rod layer, wherein the first pixel elements include first quantum rods that are aligned in a first alignment direction; driving second pixel elements of the patterned quantum rod layer, wherein the second pixel elements include second quantum rods that are aligned in a second alignment direction different from the first alignment direction; and driving the first pixel elements and the second pixel elements comprises pixel splitting whereby the first pixel elements and the second pixel elements are driven such that the patterned quantum rod layer has an off-axis luminance different from an on-axis luminance to generate a privacy viewing mode. The method of operating a display device may include one or more of the following features, either individually or in combination.

In an exemplary embodiment of the method of operating a display device, the pixel splitting comprises driving a first portion of the first pixel elements and the second pixel elements with a first pixel splitting method, and driving a second portion of the first pixel elements and the second pixels elements with a second pixel splitting method, wherein the first pixel splitting method and the second pixel splitting method have different degrees of pixel splitting; and the patterned quantum rod layer has a same mean on-axis luminance for the first pixel splitting method and the second pixel splitting method, and the patterned quantum rod layer has a different mean off-axis luminance for the first pixel splitting method and the second pixel splitting method.

In an exemplary embodiment of the method of operating a display device, the pixel splitting comprises driving a first portion of the first pixel elements and the second pixel elements with a first pixel splitting method, and driving a second portion of the first pixel elements and the second pixels elements with a second pixel splitting method, wherein the first pixel splitting method and the second pixel splitting method have different degrees of pixel splitting; and the patterned quantum rod layer has a same mean off-axis luminance for the first pixel splitting method and the second pixel splitting method, and the patterned quantum rod layer has a different mean on-axis luminance for the first pixel splitting method and the second pixel splitting method.

In an exemplary embodiment of the method of operating a display device, the first pixel splitting method includes driving the first and second pixel elements such that the first pixel elements have a greater normalized luminance than luminance without pixel splitting and the second pixel elements have a lower normalized luminance than luminance without pixel splitting; and the second pixel splitting method includes driving the first and second pixel elements such that the first pixel elements have a lower normalized luminance than luminance without pixel splitting and the second pixel elements have a greater normalized luminance than luminance without pixel splitting.

In an exemplary embodiment of the method of operating a display device, the first pixel splitting method includes driving the first and second pixel elements such that the first pixel elements have a greater normalized luminance than the second pixel elements; and the second pixel splitting method includes driving the first and second pixel elements such that the first pixel elements have a lower normalized luminance than the second pixel elements.

In an exemplary embodiment of the method of operating a display device, the first pixel splitting method includes driving the first and second pixel elements such that the luminance of the second pixels elements is zero until the first pixel elements are fully on; and the second pixel splitting method includes driving the first and second pixel elements such that the luminance of the first pixel elements is zero until the second pixel elements are fully on.

In an exemplary embodiment of the method of operating a display device, the second pixel splitting method corresponds to performing no pixel splitting.

In an exemplary embodiment of the method of operating a display device, the method further includes driving the first and second pixel elements without pixel splitting such that the patterned quantum rod layer has the same off-axis luminance and on-axis luminance to generate a non-privacy viewing mode; wherein when driving the first and second pixel elements without pixel splitting, the first pixel elements and the second pixel elements have the same luminance Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present application relates to display devices in which a privacy viewing mode is desirable. Examples of such devices include mobile phones, laptop, tablet and other computing devices, and other like display devices in which a privacy mode may be implemented to provide a veil view to an off-axis viewer.

REFERENCE SIGNS LIST

10—quantum rods
12—quantum rod layer
20—Qrod pixel array
22—pixel elements
24—quantum rods (Qrods)
30—Qrod pixel array
32—pixels
34—individual subpixels
36—quantum rods
40—Qrod pixel array
42—pixels
44—individual subpixels
46—quantum rods
50—Qrod pixel array
52—pixel elements
54—quantum rods
60—Qrod pixel array
62—pixel elements
64—quantum rods
100/100a-d—display system
102—front polarizer
104—front substrate
106—transmissive type image panel liquid crystal (LC) layer
108—rear substrate
110—rear polarizer
112—patterned Qrod film layer
114—backlight
116—in-cell polarizer
118—second in-cell polarizer
120—electroluminescent display system
122—top conductor
124—top semiconductor
126—patterned Qrod film layer
128—bottom semiconductor
130—bottom conductor
132—rear substrate
140—display system
142—electronic controller
144—image data memory
146—display panel
148—column drivers
150—row drivers
152—patterned Qrod layer
154—array of pixel elements
156—a viewing mode selector

What is claimed is:

1. A display device comprising:
a patterned quantum rod layer comprising first pixel elements including first quantum rods wherein the first quantum rods are aligned in a first alignment direction, and second pixel elements including second quantum rods wherein the second quantum rods are aligned in a second alignment direction different from the first alignment direction; and
an electronic controller configured to perform pixel splitting whereby the electronic controller drives the first pixel elements and the second pixel elements such that the patterned quantum rod layer has an off-axis luminance different from an on-axis luminance to generate a privacy viewing mode.

2. The display device of claim 1, wherein the first alignment direction is oriented 90° relative to the second alignment direction.

3. The display device of claim 1, wherein the first alignment direction is along a 0°-180° azimuth axis, and the second alignment direction is along a 90°-270° azimuth axis.

4. The display device of claim 1, wherein the first and second pixel elements are arranged in an array of rows and columns, and the first pixel elements alternate on a row and column basis with the second pixel elements.

5. The display device of claim 1, wherein each of the first and second pixel elements is a subpixel that emits light of a single color.

6. The display device of claim 1, wherein each of the first and second pixel elements is a white pixel including a combination of subpixels that emit light of different colors and that have a same alignment direction.

7. The display device of claim 6, wherein the subpixels of a respective white pixel are arranged on a column basis.

8. The display device of claim 6, wherein the subpixels of a respective white pixel are arranged on a row basis.

9. The display device of claim 1, further comprising a transmissive liquid crystal cell including a front substrate, a rear substrate, and a liquid crystal layer between the front substrate and the rear substrate.

10. The display device of claim 9, wherein the patterned quantum rod layer is positioned in-cell between the front substrate and the rear substrate.

11. The display device of claim 9, wherein the patterned quantum rod layer is positioned on either a viewing side or a non-viewing side of the liquid crystal cell.

12. The display device of claim 1, wherein the patterned quantum rod layer is positioned between two semiconductor layers to form an electroluminescent display device.

13. A method of operating a display device comprising the steps of:
    driving first pixel elements of a patterned quantum rod layer, wherein the first pixel elements include first quantum rods that are aligned in a first alignment direction;
    driving second pixel elements of the patterned quantum rod layer, wherein the second pixel elements include second quantum rods that are aligned in a second alignment direction different from the first alignment direction; and
    driving the first pixel elements and the second pixel elements comprises pixel splitting whereby the first pixel elements and the second pixel elements are driven such that the patterned quantum rod layer has an off-axis luminance different from an on-axis luminance to generate a privacy viewing mode.

14. The method of operating a display device of claim 13, wherein:
    the pixel splitting comprises driving a first portion of the first pixel elements and the second pixel elements with a first pixel splitting method, and driving a second portion of the first pixel elements and the second pixels elements with a second pixel splitting method, wherein the first pixel splitting method and the second pixel splitting method have different degrees of pixel splitting; and
    the patterned quantum rod layer has a same mean on-axis luminance for the first pixel splitting method and the second pixel splitting method, and the patterned quantum rod layer has a different mean off-axis luminance for the first pixel splitting method and the second pixel splitting method.

15. The method of operating a display device of claim 13, wherein:
    the pixel splitting comprises driving a first portion of the first pixel elements and the second pixel elements with a first pixel splitting method, and driving a second portion of the first pixel elements and the second pixels elements with a second pixel splitting method, wherein the first pixel splitting method and the second pixel splitting method have different degrees of pixel splitting; and
    the patterned quantum rod layer has a same mean off-axis luminance for the first pixel splitting method and the second pixel splitting method, and the patterned quantum rod layer has a different mean on-axis luminance for the first pixel splitting method and the second pixel splitting method.

16. The method of operating a display device of claim 14, wherein:
    the first pixel splitting method includes driving the first and second pixel elements such that the first pixel elements have a greater normalized luminance than luminance without pixel splitting and the second pixel elements have a lower normalized luminance than luminance without pixel splitting; and
    the second pixel splitting method includes driving the first and second pixel elements such that the first pixel elements have a lower normalized luminance than luminance without pixel splitting and the second pixel elements have a greater normalized luminance than luminance without pixel splitting.

17. The method of operating a display device of claim 14, wherein:
    the first pixel splitting method includes driving the first and second pixel elements such that the first pixel elements have a greater normalized luminance than the second pixel elements; and
    the second pixel splitting method includes driving the first and second pixel elements such that the first pixel elements have a lower normalized luminance than the second pixel elements.

18. The method of operating a display device of claim 14, wherein:
    the first pixel splitting method includes driving the first and second pixel elements such that the luminance of the second pixels elements is zero until the first pixel elements are fully on; and
    the second pixel splitting method includes driving the first and second pixel elements such that the luminance of the first pixel elements is zero until the second pixel elements are fully on.

19. The method of operating a display device of claim 14, wherein the second pixel splitting method corresponds to performing no pixel splitting.

20. The method of operating a display device of claim 13, further comprising driving the first and second pixel elements without pixel splitting such that the patterned quantum rod layer has the same off-axis luminance and on-axis luminance to generate a non-privacy viewing mode;
    wherein when driving the first and second pixel elements without pixel splitting, the first pixel elements and the second pixel elements have the same luminance.

* * * * *